US012216344B2

(12) United States Patent
Scofield

(10) Patent No.: US 12,216,344 B2
(45) Date of Patent: Feb. 4, 2025

(54) OPTICAL MODULATOR AND METHOD OF FABRICATING AN OPTICAL MODULATOR

(71) Applicant: ROCKLEY PHOTONICS LIMITED, Altrincham (GB)

(72) Inventor: Adam Scofield, Los Angeles, CA (US)

(73) Assignee: Rockley Photonics Limited, Altrincham (GB)

( * ) Notice: Subject to any disclaimer, the term of this patent is extended or adjusted under 35 U.S.C. 154(b) by 180 days.

(21) Appl. No.: 17/753,193

(22) PCT Filed: Aug. 25, 2020

(86) PCT No.: PCT/EP2020/073760
§ 371 (c)(1),
(2) Date: Feb. 23, 2022

(87) PCT Pub. No.: WO2021/037857
PCT Pub. Date: Mar. 4, 2021

(65) Prior Publication Data
US 2022/0276512 A1     Sep. 1, 2022

Related U.S. Application Data

(60) Provisional application No. 62/938,823, filed on Nov. 21, 2019, provisional application No. 62/891,870, filed on Aug. 26, 2019.

(30) Foreign Application Priority Data

Oct. 18, 2019  (GB) ........................................ 1915141

(51) Int. Cl.
*G02B 6/12*   (2006.01)
*G02F 1/025*  (2006.01)

(52) U.S. Cl.
CPC ............... *G02F 1/025* (2013.01); *G02B 6/12* (2013.01); *G02B 6/12004* (2013.01);
(Continued)

(58) Field of Classification Search
CPC .................. G02B 6/12004; G02B 2006/12178
See application file for complete search history.

(56) References Cited

U.S. PATENT DOCUMENTS

| 2004/0036114 A1* | 2/2004 | Taylor | ............... H01L 29/66772 |
| | | | 257/E21.415 |
| 2008/0164572 A1* | 7/2008 | Toyoda | ............... H01L 21/3247 |
| | | | 438/459 |

(Continued)

FOREIGN PATENT DOCUMENTS

| CN | 106291990 A | * | 1/2017 | ........... G02F 1/0018 |
| GB | 2563278 A |   | 12/2018 | |
| WO | 2009020432 A1 | | 2/2009 | |

OTHER PUBLICATIONS

CN-106291990-A English translation (Year: 2017).*
(Continued)

*Primary Examiner* — Charlie Y Peng
(74) *Attorney, Agent, or Firm* — Lewis Roca Rothgerber Christie LLP

(57) ABSTRACT

A MOS capacitor-type optical modulator comprising a silicon-on-insulator (SOI) substrate, a first doped region in a silicon device layer of the SOI substrate, and a second doped region laterally separated from the first doped region by a vertically extending insulator layer to form a lateral MOS capacitor region. The first doped region, second doped region and insulator layer are formed from different materials.

19 Claims, 18 Drawing Sheets

(52) U.S. Cl.
CPC .............. *G02B 2006/12061* (2013.01); *G02B 2006/12142* (2013.01); *G02B 2006/12173* (2013.01); *G02B 2006/12176* (2013.01); *G02B 2006/12178* (2013.01)

(56) References Cited

U.S. PATENT DOCUMENTS

| | | | | |
|---|---|---|---|---|
| 2008/0308837 | A1* | 12/2008 | Gauthier, Jr. | H01L 27/0262 |
| | | | | 257/107 |
| 2009/0242935 | A1* | 10/2009 | Fitzgerald | H01L 27/144 |
| | | | | 257/187 |
| 2010/0215309 | A1 | 8/2010 | Shubin et al. | |
| 2015/0212344 | A1 | 7/2015 | Patel et al. | |
| 2017/0075148 | A1* | 3/2017 | Baudot | G02F 1/025 |
| 2017/0212368 | A1* | 7/2017 | Liang | G02F 1/3133 |
| 2020/0159048 | A1* | 5/2020 | Andy | G02F 1/025 |
| 2020/0292854 | A1* | 9/2020 | Zhang | G02F 1/025 |

OTHER PUBLICATIONS

International Search Report and Written Opinion of the International Searching Authority, corresponding to PCT/EP2020/073760, mailed Nov. 11, 2020, 20 pages.

Liang, D. et al., "A Tunable Hybrid III-V-on-Si MOS Microring Resonator with Negligible Tuning Power Consumption", 2016 Optical Fiber Communications Conference and Exhibition (OFC), 2016, 3 pages, OSA.

Shu, H. et al., "Significantly High Modulation Efficiency of Compact Graphene Modulator Based on Silicon Waveguide", Scientific Reports, Jan. 17, 2018, pp. 1-8, vol. 8, No. 1, www.nature.com.

J.K. Intellectual Property Office Search and Examination Report, for Patent Application No. GB1915141.4, dated Apr. 8, 2020, 7 pages.

J.K. Intellectual Property Office Search and Examination Report, for Patent Application No. GB2117211.9, dated Jul. 8, 2022, 4 pages.

* cited by examiner

OPTICAL MODULATOR AND METHOD OF FABRICATING AN OPTICAL MODULATOR

CROSS REFERENCE TO RELATED APPLICATIONS

This application is a National Stage Application of PCT/EP2020/073760, filed 25 Aug. 2020, which claims benefit of Ser. No. 62/891,870, filed 26 Aug. 2019 and 62/938,823, filed 21 Nov. 2019 in the United States and 1915141.4, filed 18 Oct. 2019 in Great Britain; each of the applications identified in this paragraph is incorporated herein by reference. To the extent appropriate, a claim of priority is made to each of the above-identified applications.

FIELD OF THE INVENTION

One or more aspects of embodiments according to the present invention relate to an optical modulator, and more particularly to an MOS capacitor-type optical modulator.

BACKGROUND

Silicon MOS capacitor-type modulators may have a high loss. III-V Si MOS capacitor-type modulators are hybrid structures which are more efficient, but may be less suitable for high volume manufacture.

III-V Si MOS capacitor-type modulators can be fabricated by bonding pieces of III-V material on silicon wafer. In addition to being unsuitable for high volume manufacture, the bonding fabrication process also limits the possible geometrical configurations of the modulator.

Some III-V Si MOS capacitor-type modulators use a specialized transition layer, such as epitaxially grown crystalline rare earth oxide (REO). Although these modulators are monolithic and therefore suitable for high volume manufacturing, the fabrication steps required to make the modulator are complex. Furthermore, this process requires a Si(111) device layer orientation, which is less desirable than other Si device layers, such as a Si(100) device layer. Specifically, Si(111) is less common and more expensive than Si(100), and some etching techniques cannot be repeated on Si(111).

SUMMARY

Embodiments of the present invention aim to solve the above problems by providing, according to a first aspect, a MOS capacitor-type optical modulator comprising:
  a silicon-on-insulator, SOI, substrate;
  a first doped region in a silicon device layer of the SOI substrate; and
  a second doped region laterally separated from the first doped region by a vertically extending insulator layer to form a lateral MOS capacitor region, wherein the first doped region, second doped region and insulator layer are formed from different materials.

In this way, the modulator is monolithic, without requiring the silicon device layer of the SOI substrate to have a Si(111) device layer orientation. Furthermore, no specialized transition layer, such as a crystalline REO layer is required.

The optical modulator may have any one, or any combination insofar as they are compatible, of the optional features set out below.

The SOI substrate may comprise a silicon base, a buried oxide (BOX) layer on top of the silicon base, and a silicon device layer (i.e. top silicon layer) on top of the BOX layer.

As used herein, the terms "vertically" and "horizontally" are to be understood as relative to the BOX layer such that "vertically" is perpendicular to the upper surface of the BOX layer, and "horizontally" relates to a direction which lies within any plane that is parallel to the plane which lies along the upper surface of the BOX layer. Lateral, as used herein, may be understood to mean along the horizontal plane.

As used herein, the lateral MOS capacitor region may be a region of the device at which an optical mode propagates, and is formed by a p-i-n junction, wherein the p-i-n junction comprises the first doped region, the insulator layer and the second doped region. The insulator layer may extend vertically, laterally separating the first and second doped regions such that the p-i-n junction of the lateral MOS capacitor region extends perpendicularly to the BOX layer. The insulator layer may extend at an oblique angle relative to the substrate, so as to laterally separate the second doped region from the first doped region. For example, insulator layer may extend at an angle greater than 0° and less than 90°.

The first doped region may contain dopants of a different species to the second doped region. Specifically the first doped region may have an opposite doping type to the second doped region. For example, the first doped region may be a p-doped region and the second doped region may be an n-doped region. Alternatively, the first doped region may be an n-doped region and the second doped region may be a p-doped region.

The second doped region may be formed in semiconductor region, and more particularly a type III-V semiconductor region, a type II-VI semiconductor region or a type IV semiconductor region. The semiconductor region may be epitaxially grown from the silicon device layer of the SOI substrate.

In some embodiments, the semiconductor region may extend from the silicon device layer at a region of the silicon device layer laterally offset from the MOS capacitor region.

In embodiments in which the semiconductor region is a type III-V semiconductor region, the semiconductor region may be an InP, GaAs, InGaAs, or InGaAsP semiconductor region.

The insulator layer may comprise silicon nitride.

The silicon device layer of the SOI substrate may have a (100) crystalline orientation.

Optionally, a portion of the insulator layer may extend horizontally on top of the first doped region of the silicon device layer. Another portion of the insulator layer may extend horizontally beneath the second doped region of the semiconductor region. Accordingly, the insulator layer may form a "Z" shape, wherein the vertically extending portion of the "Z" shape of the insulator layer forms the insulator of the p-i-n junction of the MOS capacitor region between the first and second doped regions.

In some embodiments, a portion of the silicon device layer may extend vertically away from the BOX layer. Specifically, the first doped region in the silicon device layer may extend vertically away from the BOX layer. A portion of the semiconductor region may also extend vertically.

Specifically, the second doped region of the semiconductor region may extend vertically. Accordingly, the vertically-extending insulator layer may laterally separate the vertically extending first doped region and vertically extending second doped region.

In some embodiments, an upper horizontal portion of the semiconductor region may extend horizontally over the horizontally-extending portion of the insulator layer which itself extends horizontally over the first doped region of the silicon device layer. Accordingly, the semiconductor region may form a "Z" shape, such that both the vertical portion and the upper horizontal portion of the "Z" shaped insulator section forms the insulator of the p-i-n junction of the MOS capacitor region between the first and second doped regions. In these embodiments, the p-i-n junction extends both perpendicularly and parallel to the BOX layer.

The structure of the MOS capacitor-type optical modulator can be identified by cross-section imaging, such as FIB or SEM.

According to embodiments of a second aspect of the invention, there is provided a method of fabricating the MOS capacitor-type optical modulator of the first aspect.

Specifically, according to the second aspect, there is provided a method of fabricating a MOS capacitor-type optical modulator having a lateral MOS capacitor region, the lateral MOS capacitor region comprising a vertically extending insulator layer laterally separating a first doped region and a second doped region, wherein the method comprises the steps of:

providing a first doped region in a silicon device layer of a silicon-on-insulator, SOI, substrate; and epitaxially growing a semiconductor region from the silicon device layer of the SOI substrate, wherein the semiconductor region comprises the second doped region, and the first doped region, second doped region and insulator layer are each formed from different materials.

The method may have any one, or any combination insofar as they are compatible, of the optional features set out below.

In some embodiments, the semiconductor region may be epitaxially grown from a region of the silicon device layer laterally offset from the MOS capacitor region.

In this way, the semiconductor region is grown from the silicon device layer from a region away from the MOS capacitor region. Accordingly, any defects in the grown semiconductor region are limited to a region within close proximity to the region of the silicon device from where the growth of the semiconductor region is initiated. Thus, any defects in the semiconductor region are positioned away from the MOS capacitor region, such that they have a reduced impact on the performance of the modulator. Furthermore, in some embodiments, a region of the semiconductor region adjacent to the region of the silicon device layer from which the semiconductor region is epitaxially grown may be selectively etched without removing a region of the semiconductor region in the MOS capacitor region, so that the entire semiconductor region is of high crystalline quality.

In some embodiments, the semiconductor region is a type III-V semiconductor region. In further embodiments, the semiconductor region may be an InP, GaAs, InGaAs, or InGaAsP semiconductor region. However, in other embodiments, the semiconductor region may be a type II-VI semiconductor region, or a type IV semiconductor region.

In some embodiments, the insulator layer may comprise dielectric material, such as silicon nitride for example.

Optionally, the silicon device layer of the SOI substrate has a (100) crystalline structure.

In some embodiments, the method may further comprise the steps of:

creating a cavity underneath an upper mask layer; and epitaxially growing the semiconductor region from the silicon device layer of the SOI substrate in the cavity.

In this way, the growth of the semiconductor region can be contained in the cavity by the upper mask layer so that the resultant modulator is monolithic without requiring a specialized transition layer, such as crystalline REO. Therefore, the silicon device layer (i.e. top silicon layer) of the SOI substrate does not require a Si(111) device layer orientation, and greater flexibility in the device design is enabled.

By creating the cavity underneath the upper mask layer, the cavity is created between the upper mask layer and the silicon device layer of the SOI substrate.

Optionally, the upper mask layer may comprise a dielectric material. For example, the upper mask layer may comprise silicon nitride.

Optionally, the step of creating the cavity may comprise:

providing a sacrificial layer;

depositing the upper mask layer on top of the sacrificial layer; and selectively etching the sacrificial layer to create the cavity.

The sacrificial layer may be provided by depositing the sacrificial layer, for example.

Accordingly, the sacrificial layer is used to form the shape of the cavity, whereby the upper mask layer is layered over the sacrificial layer before selectively etching the sacrificial layer from beneath the upper mask layer to create the cavity. By selectively etching the sacrificial layer, the sacrificial layer is removed, but the upper mask layer remains, thereby creating a cavity beneath the upper mask layer.

The method may further comprise the steps of:

etching a trench in the silicon device layer of the SOI substrate;

depositing a lower mask layer on top of the silicon device layer and in the trench;

etching an opening in the lower mask layer to the silicon device layer at a region of the silicon device layer laterally offset from the MOS capacitor region; and depositing the sacrificial layer on the lower mask layer and in the opening in the lower mask layer.

In some embodiments, the lower mask layer may be formed from the same material as the upper mask layer. Accordingly, the lower mask layer may comprise a dielectric material such as silicon nitride.

The upper mask layer and the lower mask layer may together define the cavity. Specifically, the cavity may be created above the lower mask layer and beneath the upper mask layer.

Optionally, the method may further comprise the step of etching a portion of the sacrificial layer to the lower mask layer before depositing the upper mask layer.

Accordingly, when the upper mask layer is deposited on top of the sacrificial layer, the upper and lower mask layers may surround the sacrificial layer. Therefore, when the sacrificial layer is selectively etched from between the upper and lower mask layers, the upper and lower mask layers remain, and the cavity is created beneath the upper mask layer.

According to some embodiments, the method may further comprise the step of planarizing the sacrificial layer by Chemical Mechanical Planarization (CMP).

Specifically, the sacrificial layer may be planarized before depositing the upper mask layer. Accordingly, when the upper mask layer is deposited on top of the sacrificial layer, the upper and lower mask layers may surround the sacrificial layer so that when the sacrificial layer is selectively etched from between the upper and lower mask layers, the upper and lower mask layers remain, and the cavity is created beneath the upper mask layer.

Optionally, the sacrificial layer may comprise aluminium oxide or amorphous silicon.

In some embodiments, the method may further comprise the step of etching an opening in the upper mask layer to the sacrificial layer before selectively etching the sacrificial layer to create the cavity.

Optionally, the method may comprise the step of etching a portion of the semiconductor region to form a waveguide structure, the waveguide structure comprising the MOS capacitor region.

In this step, portions of the upper and lower mask layers, and optionally a portion of the silicon device layer, may also be etched to form the waveguide structure. The waveguide structure may comprise the remaining semiconductor region, and remaining portions of the upper and lower mask layers.

The remaining portions of the upper and lower mask layer may form the insulator region of the p-i-n junction of the MOS capacitor region, and the remaining semiconductor region may form the second doped region.

In some embodiments, the step of etching a portion of the semiconductor region to form the waveguide structure includes etching the portion of the semiconductor region in and/or adjacent to the opening in the lower mask layer at the region of the silicon device layer laterally offset from the MOS capacitor region. As any defects in the semiconductor region are limited to this portion of the semiconductor region, defects can be removed by this etching without affecting the MOS capacitor region. Therefore, the entire remaining semiconductor region can be of high crystalline quality.

The method may further comprise the steps of:
depositing an isolation layer on the waveguide structure;
applying a first electrical contact through the isolation layer to the silicon device layer (i.e. the first doped region); and
applying a second electrical contact through the isolation layer to the semiconductor region (i.e. the second doped region).

Optionally, the isolation layer may be an isolation oxide, such as silicon dioxide. The electrical contact may be applied to regions of the silicon device layer and semiconductor region that are laterally offset from the MOS capacitor region.

Optionally, the method may comprise the step of planarizing the semiconductor region by CMP.

According to embodiments of a third aspect of the invention, there is provided a method of fabricating a MOS capacitor-type optical modulator having a MOS capacitor region comprising a semiconductor region, the method comprising the steps of:
creating a cavity underneath an upper mask layer; and
epitaxially growing the semiconductor region from a silicon device layer of a silicon-on-insulator, SOI, substrate in the cavity.

It should be noted that the method of the third aspect is not limited to fabricating a MOS capacitor-type optical modulator having a lateral MOS capacitor region with a vertically extending insulator layer. In fact, in the method of the third aspect, the cavity etch may be intentionally sloped (i.e. not vertical or horizontal) using a dry etch or a selective wet etch.

In this way, the growth of the semiconductor region can be contained in the cavity by the upper mask layer so that the resultant modulator is monolithic without requiring a specialized transition layer, such as crystalline REO. Therefore, the silicon device layer of the SOI substrate does not require a Si(111) device layer orientation, and greater flexibility in the device design is enabled.

By creating the cavity underneath the upper mask layer, the cavity is created between the upper mask layer and the silicon device layer of the SOI substrate.

The disclosure includes the combination of the aspects and optional features described above except where such a combination is clearly impermissible or expressly avoided.

BRIEF DESCRIPTION OF THE DRAWINGS

Embodiments of the invention will now be described by way of example with reference to the accompanying drawings in which.

DETAILED DESCRIPTION

The detailed description set forth below in connection with the appended drawings is intended as a description of exemplary embodiments of a MOS capacitor-type optical modulator and its method of fabrication provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A MOS capacitor-type optical modulator 1 and its method of fabrication according to a first embodiment are described below with reference to FIGS. 1 and 3a-l. The modulator 1 comprises a SOI substrate 20.

Figure 3A:
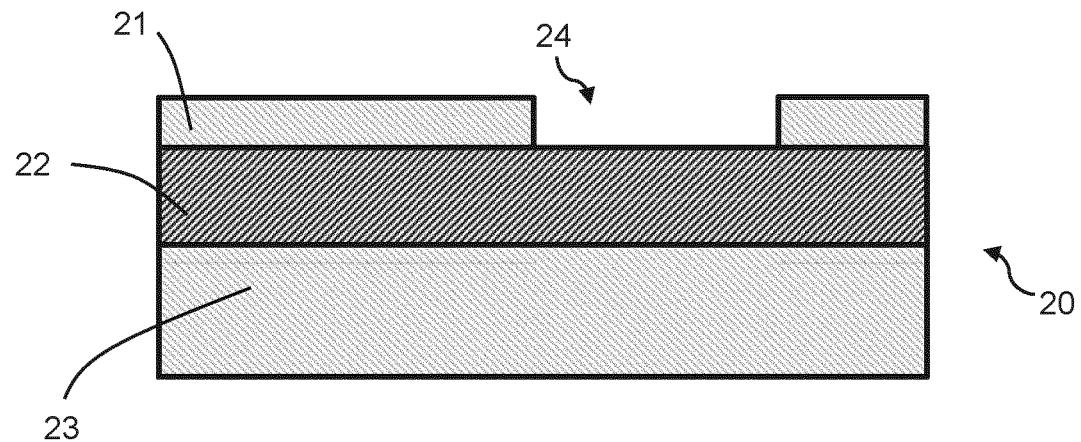
FIGS. 3a-3l depict steps of a method of fabricating the modulator of FIG. 1.

As shown in FIG. 3a, the silicon-on-insulator substrate 20 is initially provided comprising a silicon base layer 23, a buried silicon dioxide (BOX) layer 22 and a silicon device layer 21. The silicon device layer 21 has a Si(100) crystalline structure. A trench 24 is etched in the silicon device layer 21 to the BOX layer 22. The trench is etched using standard patterning and etching techniques. Although not illustrated in FIG. 3a, a first doped region is created in the silicon device layer 21 using standard implantation techniques.

Figure 3B:
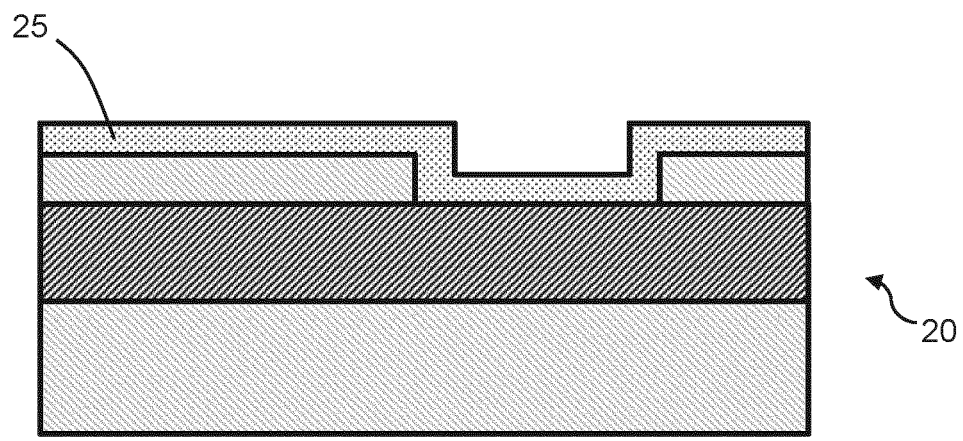

Next, as shown in FIG. 3b, a lower mask layer 25 comprising silicon nitride is deposited on top of the silicon device layer 21 and in the trench 24.

Figure 3C:
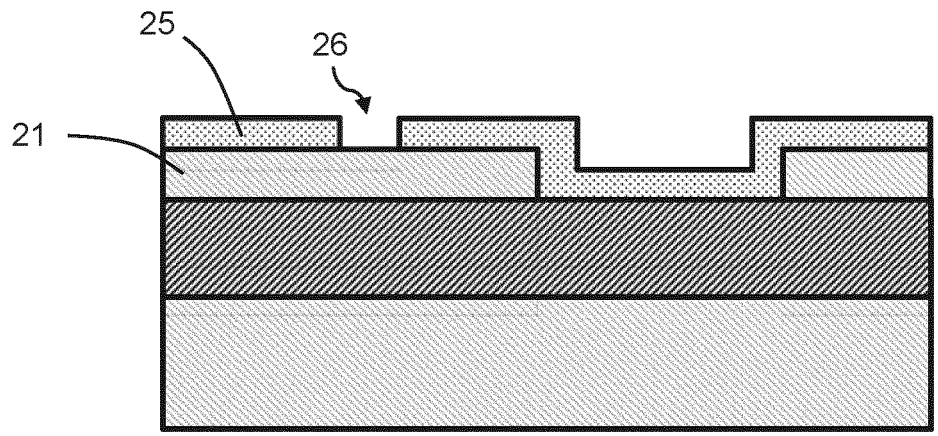

An opening 26 is then etched in the lower mask layer 25 to the silicon device layer 21 (see e.g. FIG. 3c). Again, opening 26 is etched using standard patterning and etching techniques. This opening 26 provides a point of exposed silicon from which a type III-V semiconductor layer will later be grown. The opening 26 is etched in the lower mask layer 25 in a region which will be laterally offset from a MOS capacitor region having a p-i-n junction of the modulator 1.

Figure 3D:
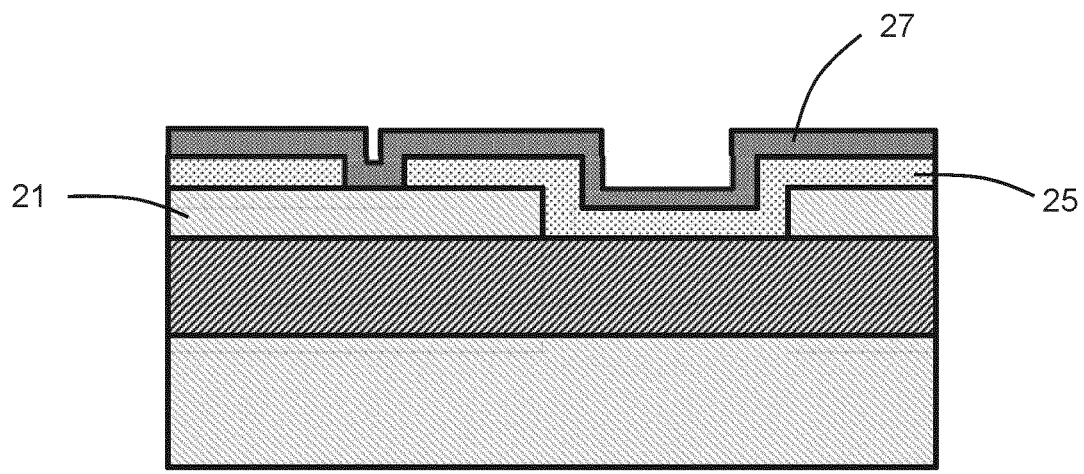

As shown in FIG. 3d, a sacrificial layer 27 is then deposited on top of the lower mask layer 25, and in the opening 26. The sacrificial layer 27 may comprise aluminium oxide or amorphous silicon, for example.

Figure 3E:
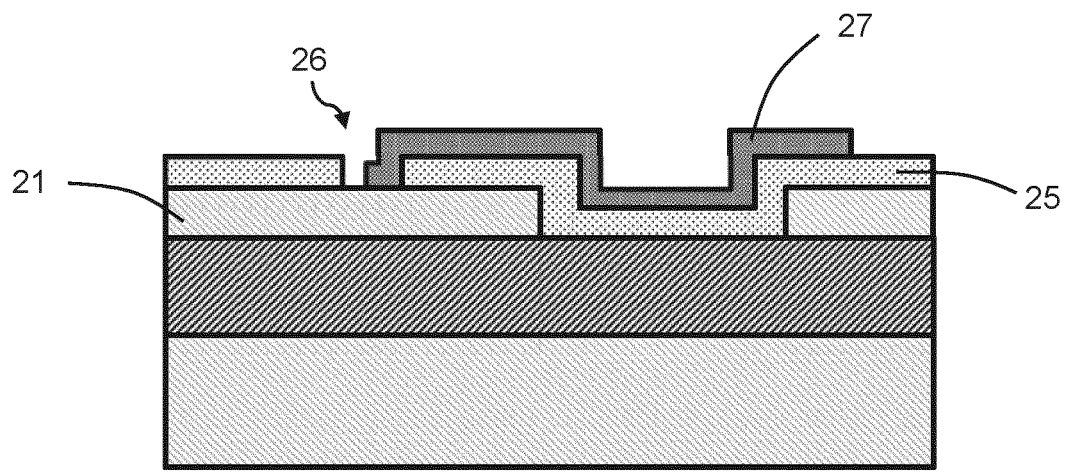

Next, a portion of the sacrificial layer 27 is etched to the lower mask layer 25. Specifically, as shown in FIG. 3e, a portion of each side of the sacrificial layer 27 is etched to reveal the lower mask layer 25 underneath. Furthermore, a portion of the sacrificial layer 27 positioned in the opening 26 in the lower mask layer 25 is etched to reveal a portion of the silicon device layer 21. In alternative embodiments, the portion of the sacrificial layer 27 positioned in the opening 26 in the lower mask layer 25 is not etched, so that the sacrificial layer 27 extends across the opening 26 and the silicon device layer 21 is not exposed. Again, standard patterning and etching techniques are used.

Figure 3F:
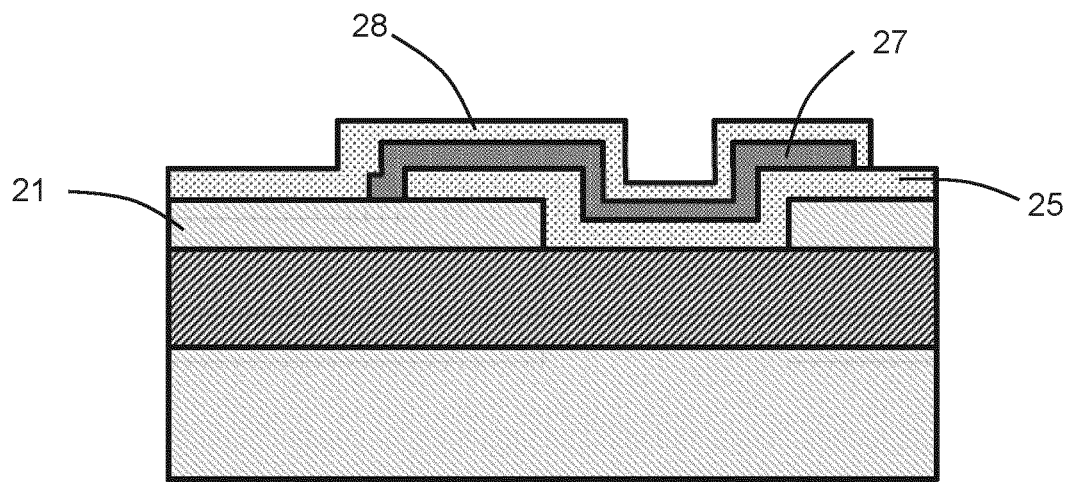

As shown in FIG. 3f, an upper mask layer 28 is then deposited on top of the sacrificial layer 27 and in the opening 26. Accordingly, the upper and lower mask layers 25, 28 surround the sacrificial layer 27.

Figure 3G:
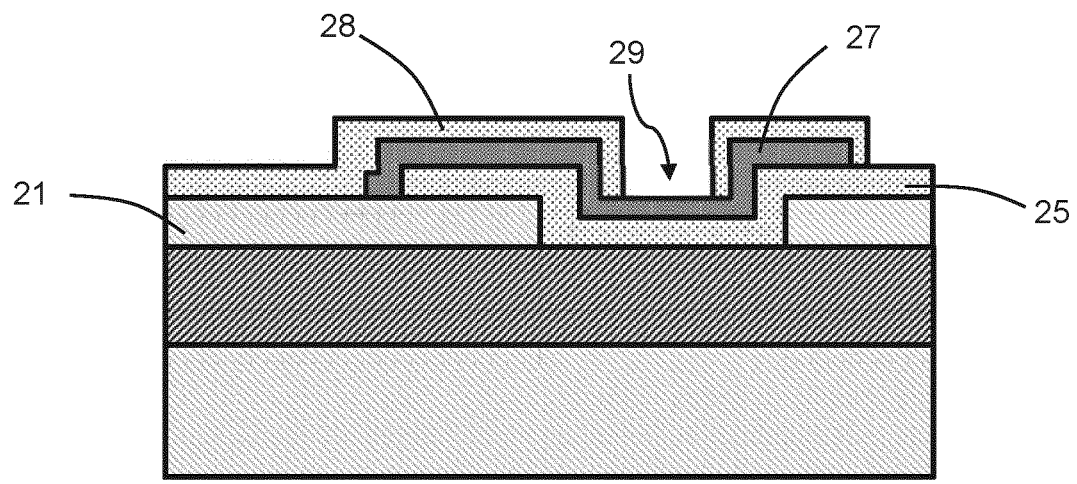
Figure 3H:
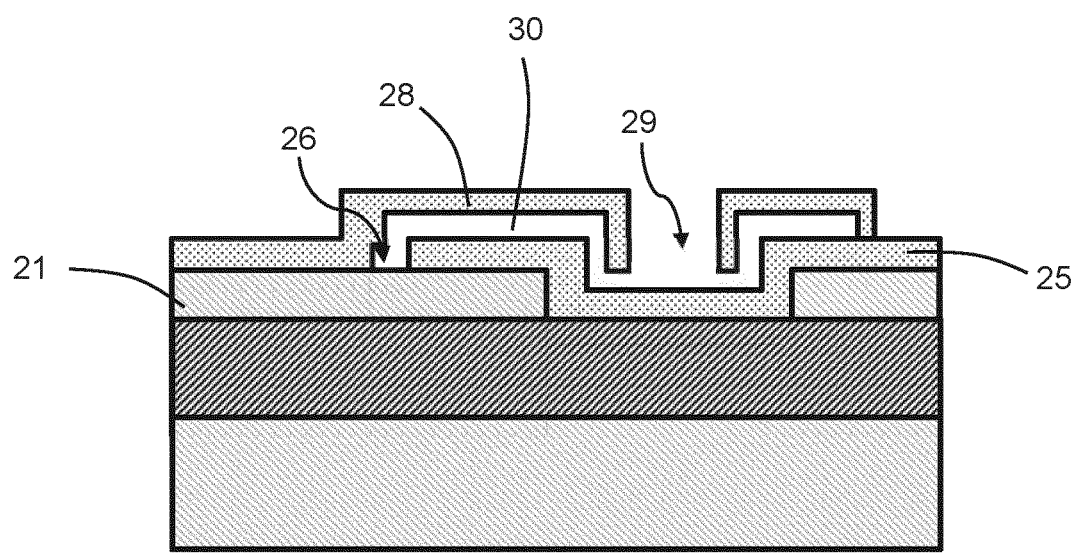

Next, an opening 29 is etched in the upper mask layer 28 to the sacrificial layer 27 (see e.g. FIG. 3g). Again, standard patterning and etching techniques are used.

The sacrificial layer 27 is then selectively etched, whilst maintaining the upper and lower mask layers 25, 28. Accordingly, a cavity 30 is formed between the upper and lower mask layers 25, 28; beneath the upper mask layer 28, and above the lower mask layer 25 (see e.g. FIG. 3h). The cavity 30 extends from the silicon device layer 21 at the opening 26 in the lower mask layer 25, between the upper and lower mask layers 25, 28 to the opening 29 in the upper mask layer 28.

Figure 3I:
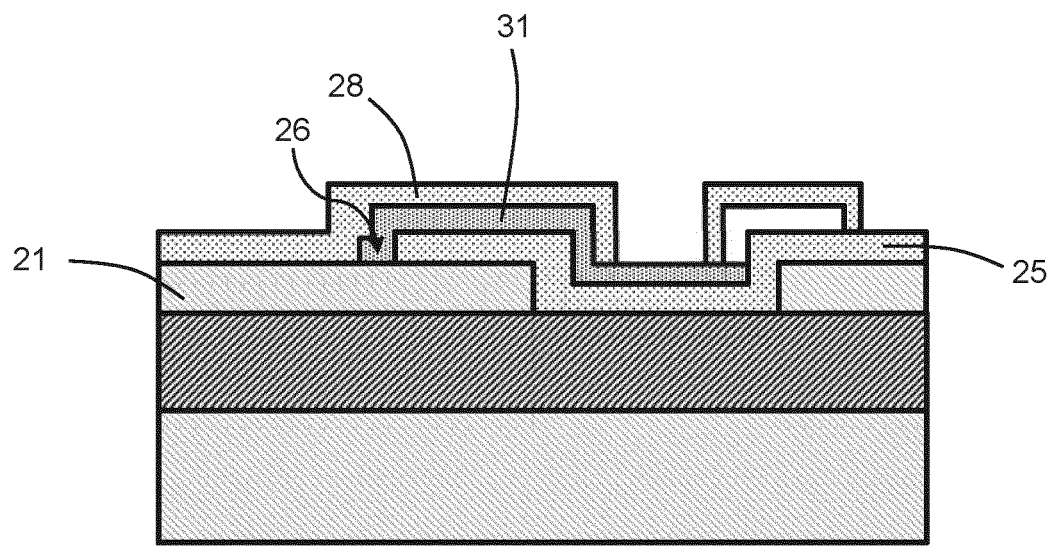

As shown in FIG. 3i, a type III-V semiconductor region 31 is then epitaxially grown in the cavity 30 from the exposed silicon device layer 21 at the opening 26 in the lower mask layer 25. Standard epitaxial growing techniques are used. The type III-V semiconductor region 31 grows to fill the shape of the cavity 30 and is thus limited by the upper and lower mask layers 25, 28. In this example embodiment, the type III-V semiconductor region 31 is InP, GaAs, InGaAs or InGaAsP, although other type III-V materials may also be used.

The second doped region of the type III-V semiconductor region 31 is created by in situ doping using standard dopant techniques. In alternative embodiments, the second doped region of the semiconductor region 31 may be created using standard implantation and/or diffusion techniques. If the first doped region is n-doped, the second doped region is p-doped, and vice versa.

Figure 3J:
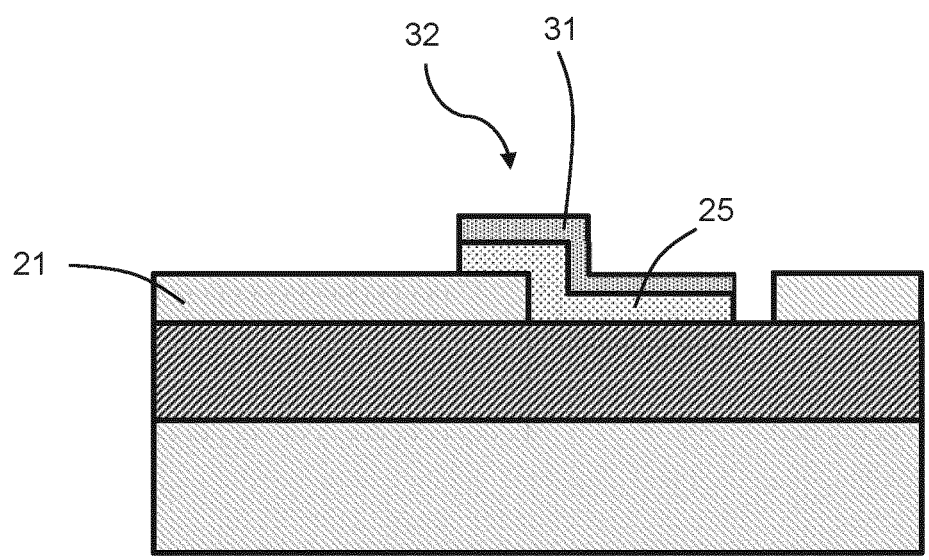

Next, a waveguide structure 32 is formed by etching a portion of the unneeded type III-V semiconductor region 31, the upper mask layer 28, and a portion of the lower mask layer 25. The waveguide structure 32 comprises a MOS capacitor region having the p-i-n junction. Again, standard etching techniques are used. As shown in FIG. 3j, the portion of the type III-V semiconductor region 31 adjacent to the silicon device layer 21 at the opening 26 is etched in this step. Accordingly, any defects in the type III-V semiconductor region 31 are removed.

An isolation layer 33 is then deposited on top of the waveguide structure 32. In the example embodiment shown in FIG. 3k, the isolation layer 33 is an isolation oxide, such as silicon dioxide.

Figure 3K:
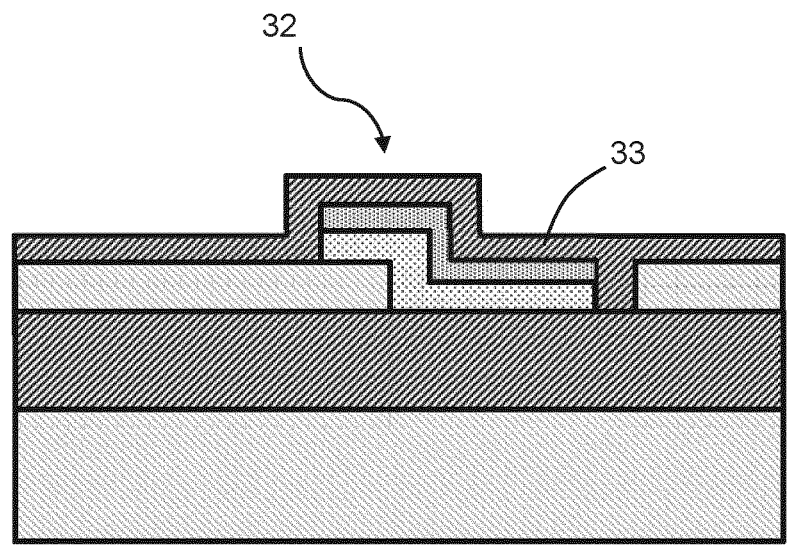
Figure 3L:
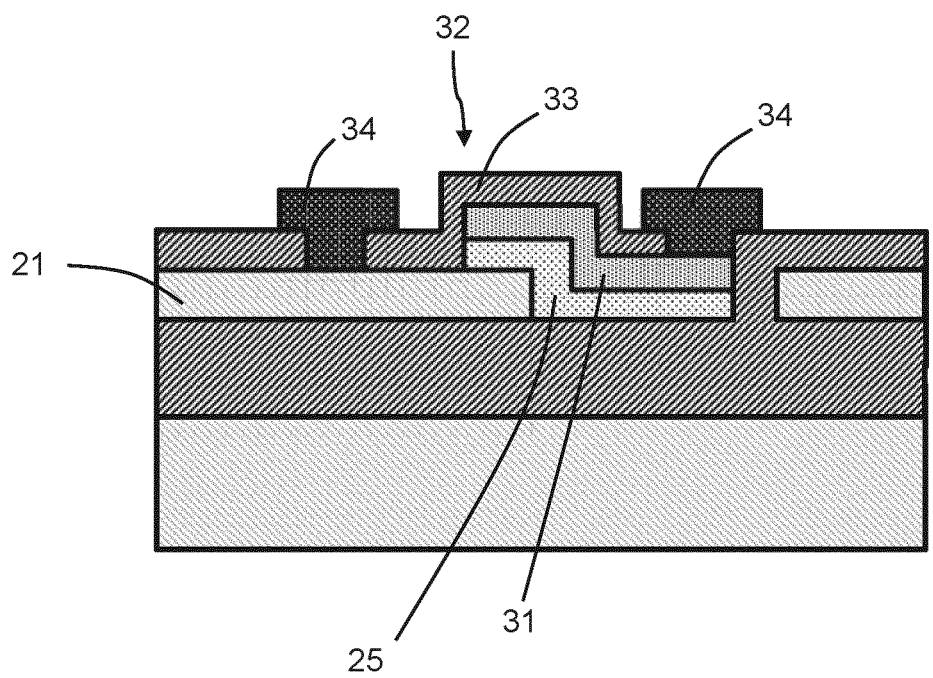

Finally, the isolation layer 33 is etched at two openings to the silicon device layer 21 and to the type III-V semiconductor region 31 respectively, and electrical contacts 34 are deposited through the isolation layer 33 (see e.g. FIG. 3l).

The electrical contacts 34 are applied to regions of the silicon device layer 21 and the type III-V semiconductor region 31 that are laterally offset from the MOS capacitor region of the waveguide structure 32. The remaining portion of the lower mask layer 25 forms the insulator layer of the p-i-n junction in the MOS capacitor region.

Figure 1:
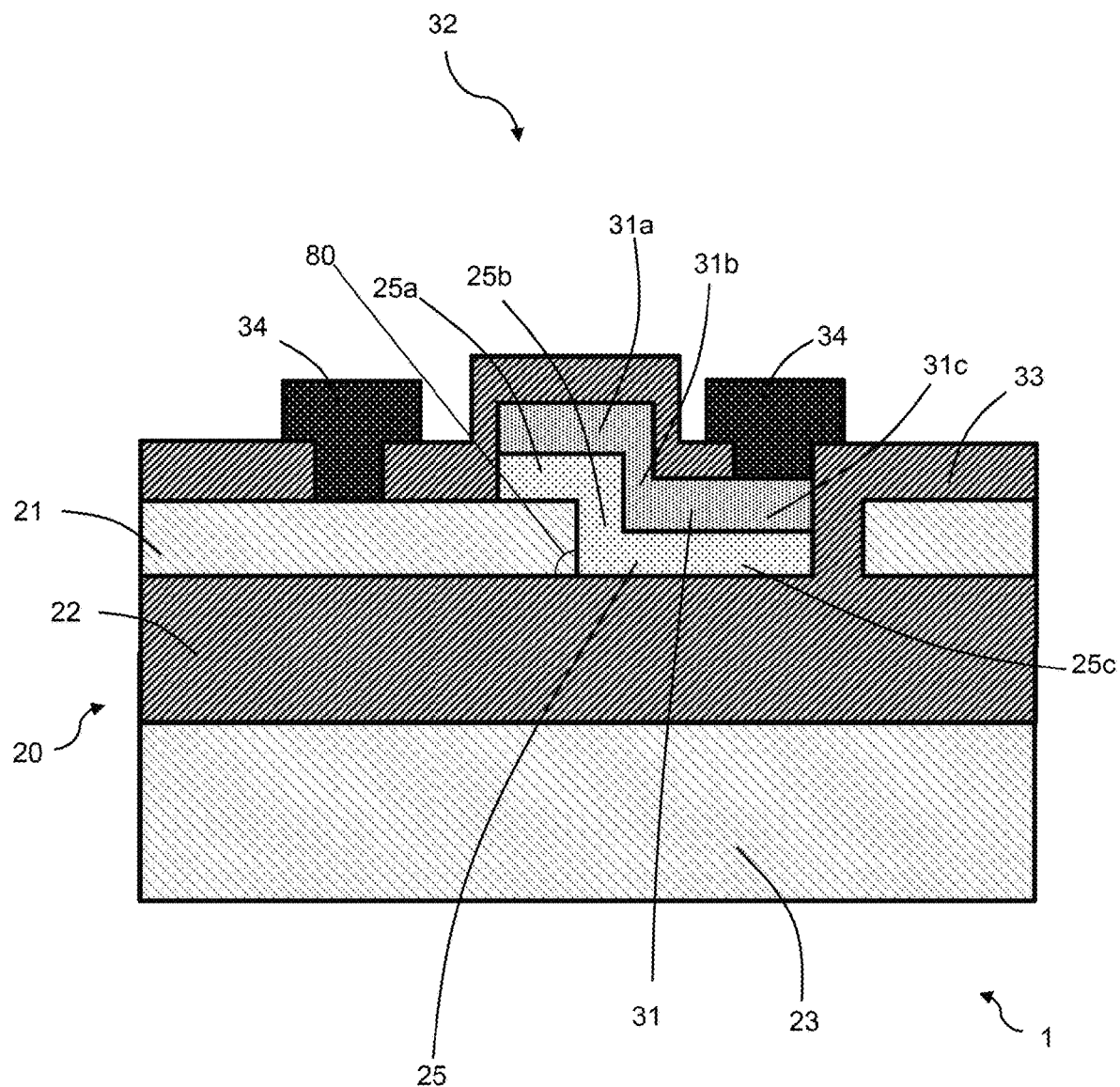
FIG. 1 is a schematic cross-section of a MOS capacitor-type optical modulator according a first embodiment of the present invention.

The resulting modulator 1 is shown in FIG. 1. The silicon device layer 21 of the SOI substrate 20 extends horizontally, parallel and contiguous with the BOX layer 22. The insulator layer 25 (formed by the lower mask layer) has a "Z" shape formed by a first upper horizontally-extending portion 25a, a second vertically-extending portion 25b, and a third lower horizontally-extending portion 25c. Advantageously, this "Z" shape increases the surface area in which charge can accumulate. This correspondingly increases the modulation efficiency, whilst not affecting the size of the optical mode.

The first horizontally-extending portion 25a of the insulator layer 25 extends above and contiguous with the silicon device layer 21, and specifically above the first doped region of the silicon device layer 21. The second vertically-extending portion 25b of the insulator layer 25 extends vertically away from the BOX layer 22 to the first upper horizontally-extending portion 25a of the insulator layer 25. Accordingly the insulator layer 25 forms both a vertical junction (i.e. at the second vertically-extending portion 25b) and a horizontal junction (i.e. at the first upper horizontally-extending portion 25a) with the silicon device layer 21, and specifically the first doped region of the silicon device layer 21. In a variation, not shown, the insulator layer 25 extends obliquely across the waveguide structure 32. For example, the insulator layer 25 is depicted in FIG. 1 as forming an angle 80 relative to the BOX layer 22, and the insulator layer 25 forms the same angle relative to the silicon base layer 23. While this angle 80 is depicted as being a right angle (90°) in FIG. 1, this angle 80 may be an oblique angle greater than 0° and less than 90° in some other examples. This extension may be a linear one, in contrast to the "Z" shaped insulator layer shown in FIG. 1.

The third lower horizontally-extending portion 25c of the insulator layer 25 extends horizontally from a lower end of the second vertically-extending portion 25b of the insulator layer 25 on top of, and contiguous with, the BOX layer 22.

Similarly to the insulator layer 25, the type III-V semiconductor region 31 also has a "Z" shape formed by a first upper horizontally-extending portion 31a, a second vertically-extending portion 31b, and a third lower horizontally-extending portion 31c.

The first upper horizontally-extending portion 31a of the type III-V semiconductor region 31 extends horizontally on top of, and is contiguous with, the first upper horizontally-extending portion 25a of the insulator layer 25. The third lower horizontally-extending portion 31c of the type III-V semiconductor region 31 extends horizontally on top of, and is contiguous with, the third lower horizontally-extending portion 25c of the insulator layer 25. The second vertically-extending portion 31b of the type III-V semiconductor region 31 extends vertically between the first upper horizontally-extending portion 31a and the third lower horizontally-extending portion 31c of the type III-V semiconductor region 31.

Accordingly, the first doped region of the silicon device layer 21 is laterally (i.e. horizontally) spaced from the second doped region of the second vertically-extending portion 31b of the type III-V semiconductor region 31 by the second vertically-extending portion 25b of the insulator layer 25. This forms a lateral MOS capacitor region.

The first doped region of the silicon device layer 21 is also vertically spaced from the first upper horizontally-extending portion 31a of the type III-V semiconductor region 31 by the first upper horizontally-extending portion 25a of the insulator layer 25. Therefore, modulator 1 has a p-i-n junction which extends both perpendicularly and parallel to the BOX layer.

In the example embodiment shown in FIG. 1, the insulator layer 25, first doped region of the silicon device layer 21, and the second doped region of the type III-V semiconductor region 31 are formed from different materials. Specifically, the insulator layer 25 comprises silicon nitride, the silicon device layer 21 has a Si(100) crystalline orientation, and the type III-V semiconductor region 31 comprises InP or InGaAsP.

A MOS capacitor-type optical modulator 100 and its methods of fabrication according to a second embodiment are described below with reference to FIGS. 2, 4a-4l and 5a-5g. The modulator 100 comprises a SOI substrate 120.

Figure 4A:
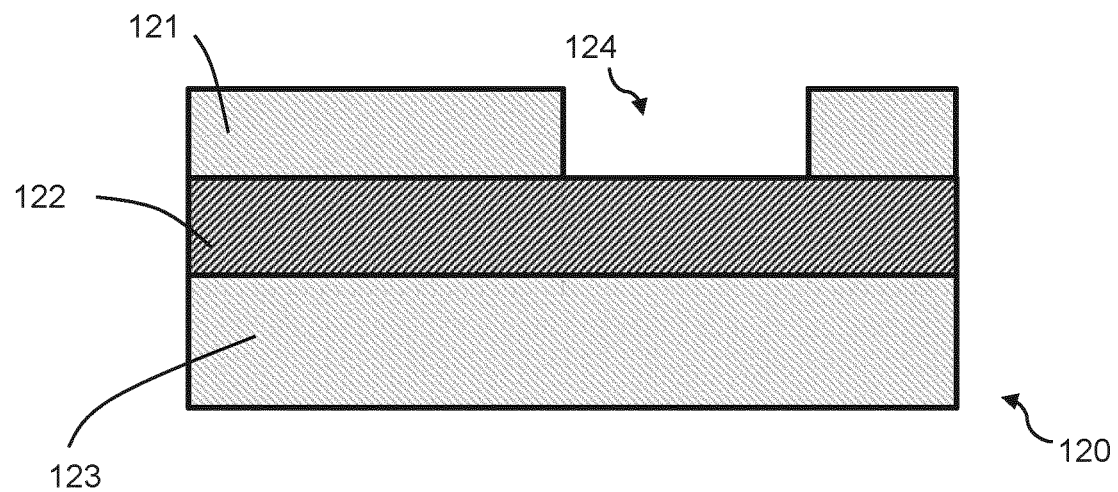
FIGS. 4a-4l depict steps of a method of fabricating the modulator of FIG. 2.

According to a first method of fabricating the MOS capacitor-type optical modulator, and as shown in FIG. 4a, the silicon-on-insulator substrate 120 is initially provided comprising a silicon base layer 123, a buried silicon dioxide (BOX) layer 122 and a silicon device layer 121. The silicon device layer 121 has a Si(100) crystalline structure. A trench 124 is etched in the silicon device layer 121 to the BOX layer 122. The trench is etched using standard patterning and etching techniques. Although not illustrated in FIG. 4a, a first doped region is created within the silicon device layer 121 using standard implantation techniques.

Figure 4B:
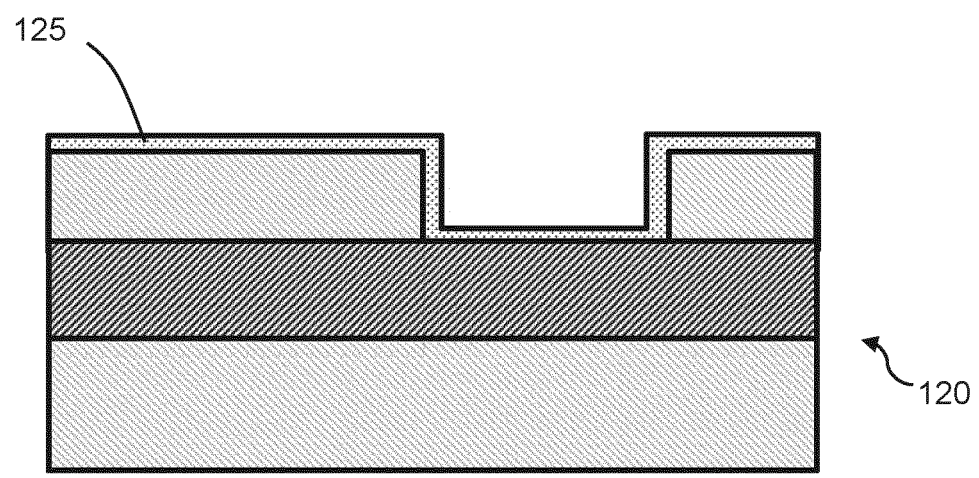
Figure 4C:
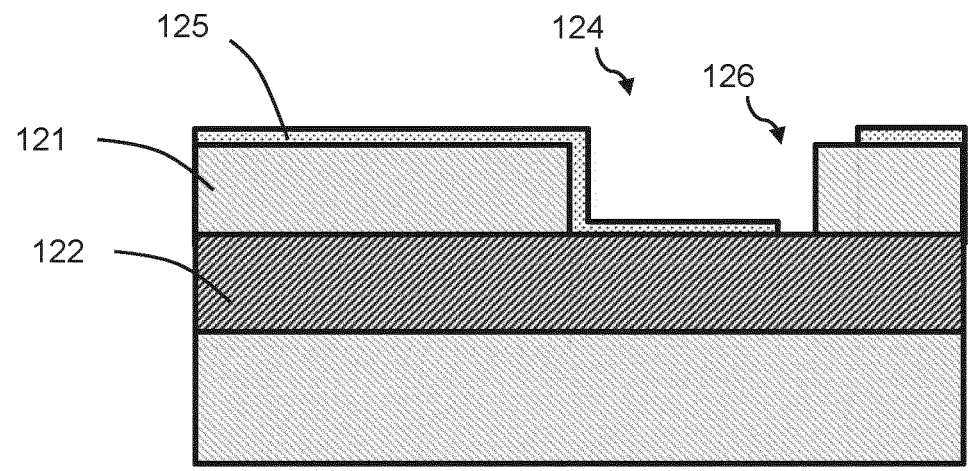

Next, as shown in FIG. 4b (and similarly to the step illustrated in FIG. 3b with reference to the first embodiment) a lower mask layer 125 comprising silicon nitride is deposited on top of the silicon device layer 121 and in the trench 124.

An opening 126 is then etched in the lower mask layer 125. However, in contrast to the corresponding step in the first embodiment, the opening 126 in the lower mask layer 125 extends to the silicon device layer 121 and the BOX layer 122 in the trench 124. Again, opening 126 is etched using standard patterning and etching techniques. This opening 126 provides a point of exposed silicon from which a type III-V layer will subsequently be grown. The opening 126 is etched in the lower mask layer 125 in a region which will be laterally offset from a MOS capacitor region having a p-i-n junction of the modulator 100.

Figure 4D:
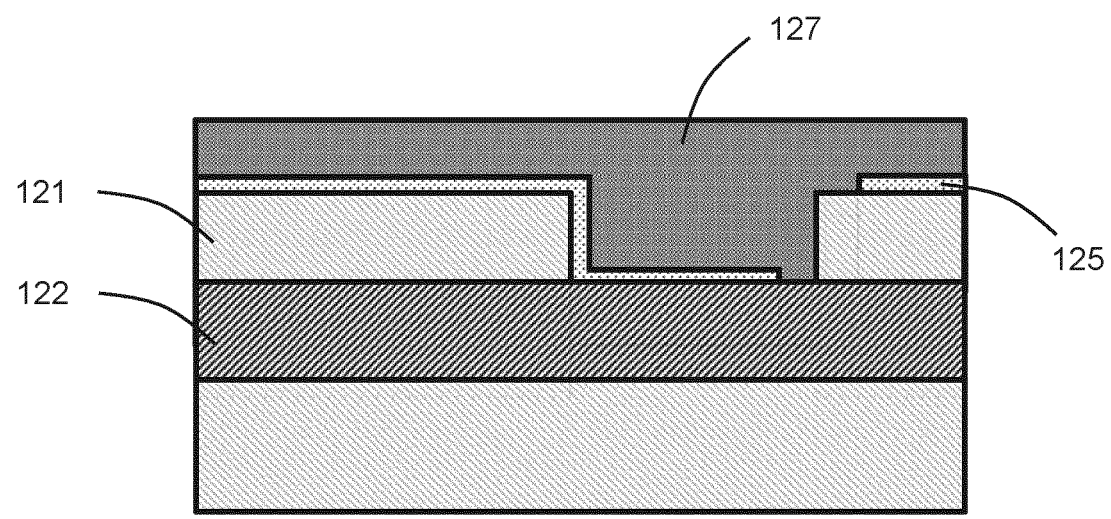

As shown in FIG. 4d, a sacrificial layer 127 is then deposited on top of the lower mask layer 125, in the trench 124 and in the opening 126. The sacrificial layer 127 may comprise aluminium oxide or amorphous silicon.

Figure 4E:
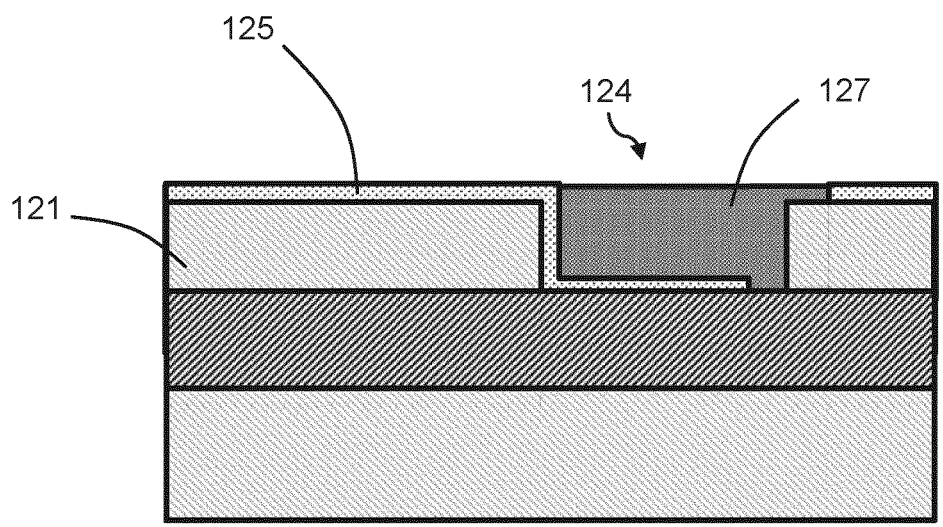

Next, the sacrificial layer 127 is planarized by Chemical Mechanical Planarization (CMP) so that the sacrificial layer 127 is only present in the trench 124 (see e.g. FIG. 4e). Accordingly, the sacrificial layer 127 in the trench 124 is levelled to the lower mask layer 125.

Figure 4F:
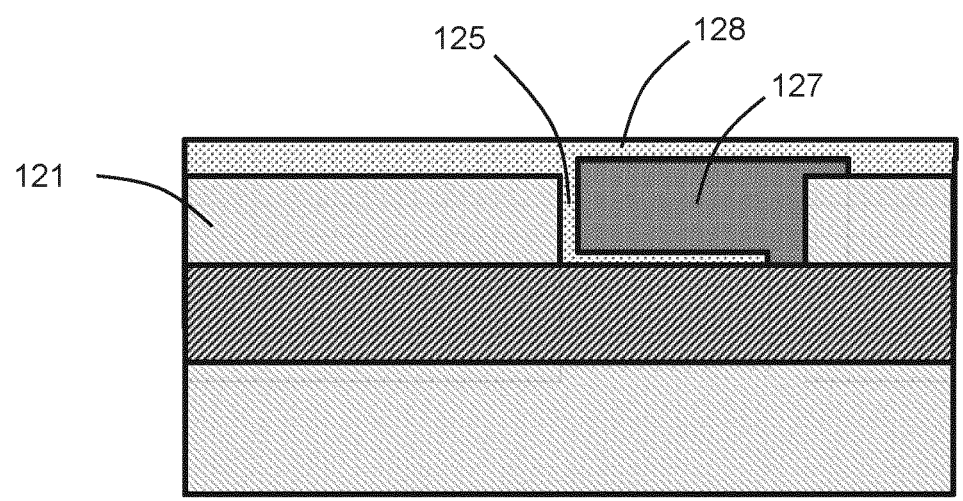
Figure 4G:
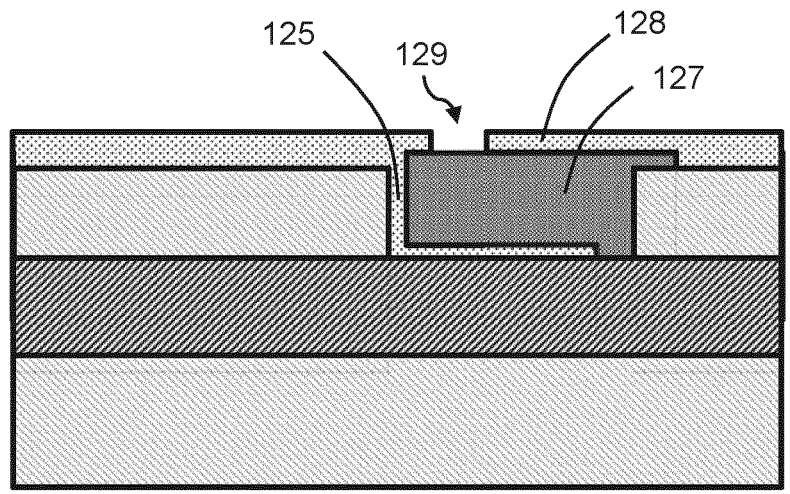
Figure 4H:
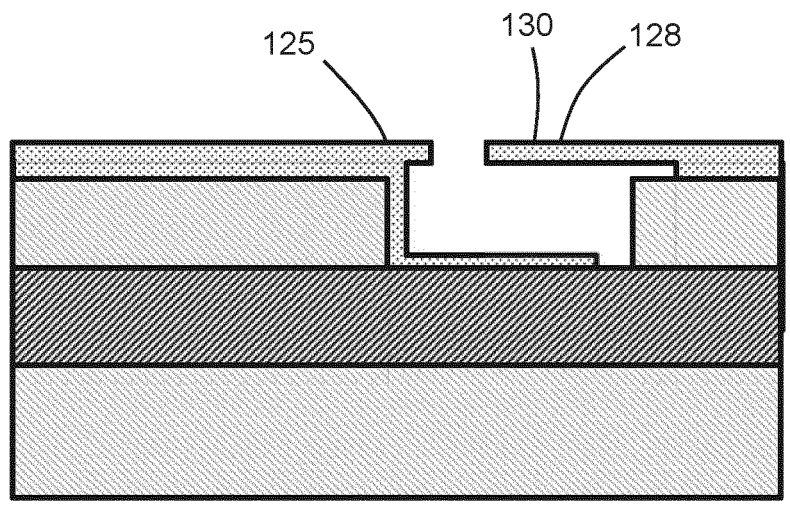

As shown in FIG. 4f, an upper mask layer 128 is then deposited on top of the sacrificial layer 127 such that the upper and lower mask layers 125, 128 surround the sacrificial layer 127.

Similarly to the step illustrated in FIG. 3g with reference to the first embodiment, an opening 129 is etched in the upper mask layer 128 to the sacrificial layer 127. Again standard patterning and etching techniques are used.

The sacrificial layer 127 is then selectively etched, whilst maintaining the upper and lower mask layers 125, 128. Accordingly, a cavity 130 is formed in the trench 124 between the upper and lower mask layers 125, 128. The cavity 130 is formed beneath the upper mask layer 128.

Figure 4I:
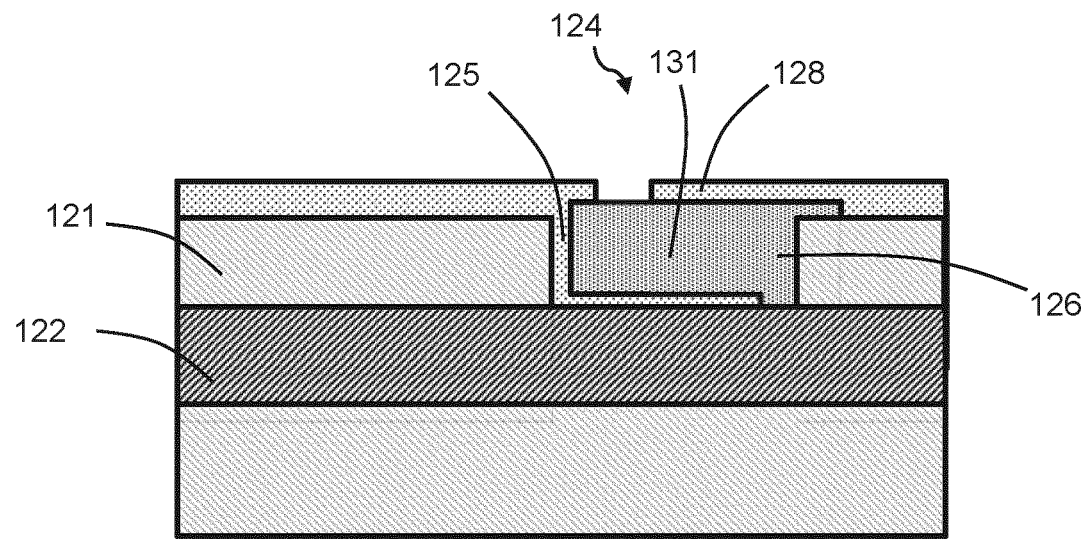
Figure 4J:
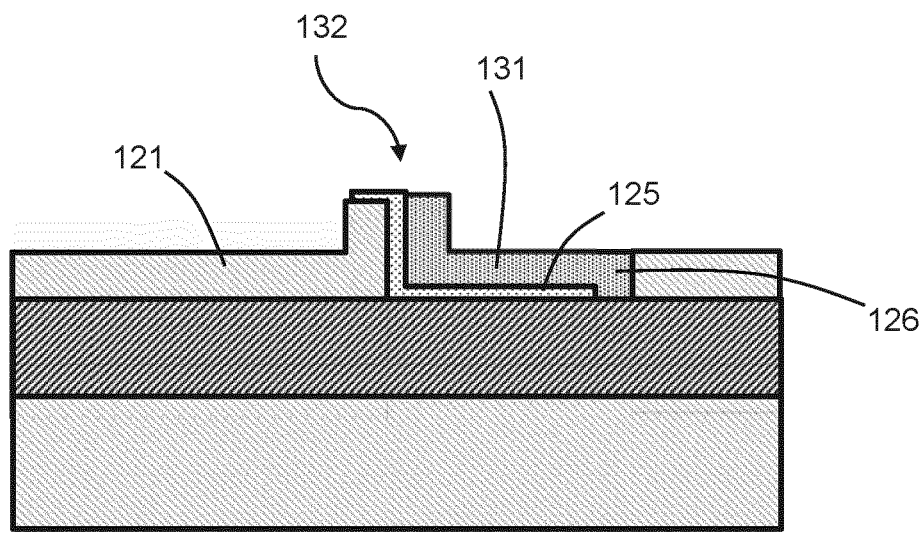
Figure 4K:
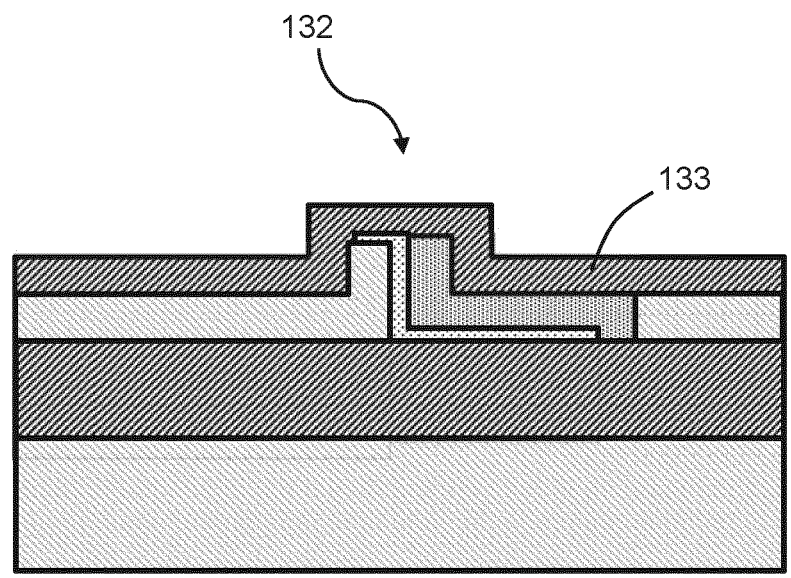

As shown in FIG. 4i, a type III-V semiconductor region 131 is then epitaxially grown in the cavity 130 from the exposed silicon device layer 121 at the opening 126 in the lower mask layer 125. Standard epitaxial growing techniques are used. The type III-V semiconductor region 131 grows to fill the shape of the cavity 130 and is thus limited by the upper and lower mask layers 125, 128. In this example embodiment, the type III-V semiconductor region 131 is InP or InGaAsP. The second doped region of the type III-V semiconductor region 131 is created by in situ doping using standard dopant techniques. If the first doped region is n-doped, the second doped region is p-doped, and vice versa.

Next, a waveguide structure 132 is formed by etching a portion of the unneeded type III-V semiconductor region 131, the upper mask layer 128 and a portion of the lower mask layer 125. The waveguide structure 132 comprises a MOS capacitor region having the p-i-n junction. Standard etching techniques are used. The portion of the type III-V semiconductor region 131 adjacent to the silicon device layer 121 at the opening 126 is positioned away from the p-i-n junction of the MOS capacitor region. Accordingly, any defects in the type III-V semiconductor region 131 are positioned away from the p-i-n junction and so have a reduced affect on the MOS capacitor region.

Similarly to the step illustrated in FIG. 3k with reference to the first embodiment, an isolation layer 133 is then deposited on top of the waveguide structure 132. In the example embodiment shown in FIG. 4k, the isolation layer 133 is an isolation oxide, such as silicon dioxide.

Figure 4L:
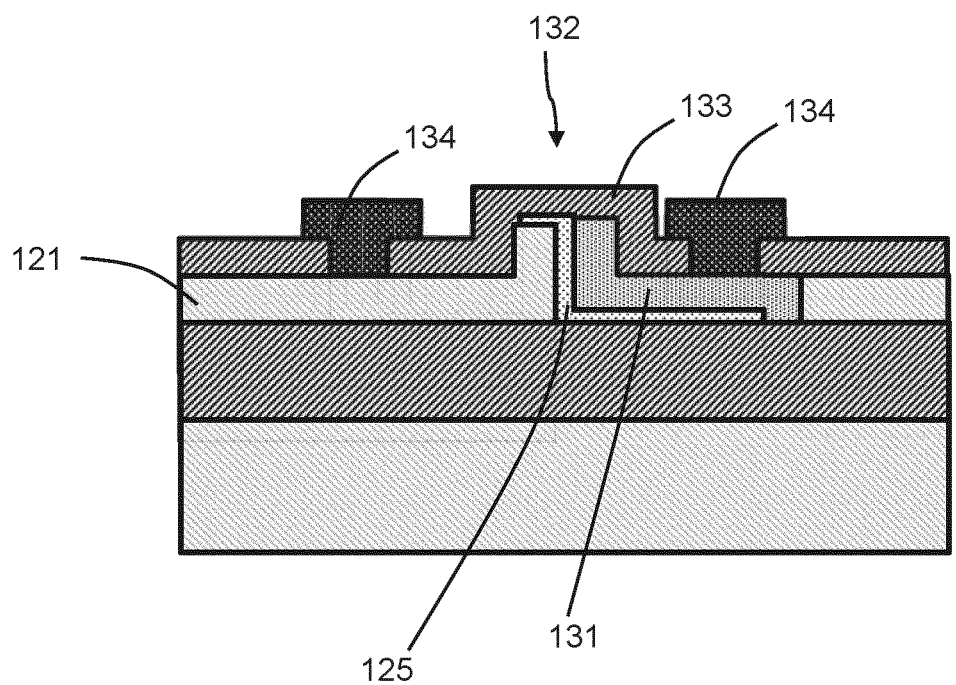

Finally, the isolation layer 133 is etched at two openings to the silicon device layer 121 and to the type III-V semiconductor region 131 respectively, and electrical contacts 134 are deposited through the isolation layer 133 (see e.g. FIG. 4l). The electrical contacts 134 are applied to regions of the silicon device layer 121 and the type III-V semiconductor region 131 that are laterally offset from the MOS capacitor region of the waveguide structure 132. The remaining portion of the lower mask layer 125 forms the insulator layer of the p-i-n junction in the MOS capacitor region.

Figure 2:
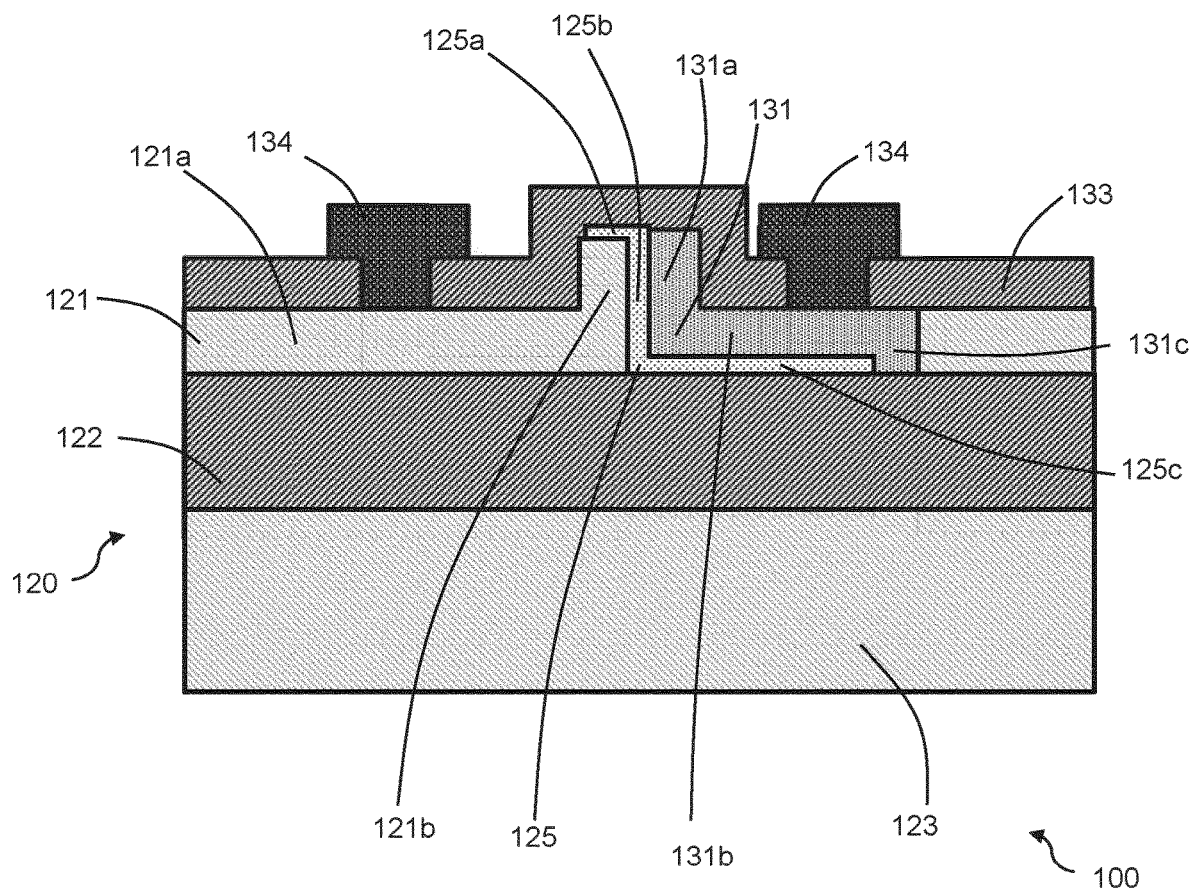
FIG. 2 is a schematic cross-section of a MOS capacitor-type optical modulator according to a second embodiment of the present invention.

The resulting modulator 100 is shown in FIG. 2. Similarly to the first embodiment shown in FIG. 1, the insulator layer 125 of modulator 2 (formed by the lower mask layer) has a "Z" shape formed by a first upper horizontally-extending portion 125a, a second vertically-extending portion 125b, and a third lower horizontally-extending portion 125c.

Unlike the first embodiment shown in FIG. 1, the silicon device layer 121 of the SOI substrate 120 shown in FIG. 2 comprises a first horizontally-extending portion 121a and a second vertically-extending portion 121b. The first horizontally-extending portion 121a extends parallel to, and on top of, the BOX layer 122, and the second vertically-extending portion 121b extends vertically away from the BOX layer 122.

The first horizontally-extending portion 125a of the insulator layer 125 extends horizontally above the vertically-extending portion 121b of the silicon device layer 121. The second vertically-extending portion 125b of the insulator layer 125 extends vertically and contiguously with the vertically-extending portion 121b of the silicon device layer 121. The third lower horizontally-extending portion 125c of the insulator layer 125 extends horizontally from a lower end of the second vertically-extending portions 125b of the insulator layer 125 on top of the BOX layer 122.

Unlike the first embodiment shown in FIG. 1, the type III-V semiconductor region 131 does not have a "Z" shape. Instead, type IIIV semiconductor region 131 comprises a first vertically-extending portion 131a, a second horizontally-extending portion 131b, and a third vertically-extending portion 131c. The first vertically-extending portion 131a of the type III-V semiconductor region 131 extends vertically and contiguously with the vertically-extending portion 125b of the insulator layer 125. Accordingly, the second vertically-extending portion 125b of the insulator layer 125 laterally (i.e. horizontally) spaces the second vertically-extending portion 121b of the silicon device layer 121, and the first vertically-extending portion 131a of the type III-V semiconductor region 131. A first doped region is formed in the second vertically-extending portion 121b of the silicon device layer 121, and a second doped region is formed in the first vertically-extending portion 131a of the type III-V semiconductor region 131, to form a lateral MOS capacitor region with a p-i-n junction which extends parallel to the BOX layer.

In the example embodiment shown in FIG. 2, the insulator layer 125, first doped region of the silicon device layer 121, and the second doped region of the type III-V semiconductor region 131 are formed from different materials. Specifically, the insulator layer 125 comprises silicon nitride, the silicon device layer has a Si(100) crystalline orientation, and the type III-V semiconductor region 131 comprises InP, GaAs, InGaAs or InGaAsP.

An alternative method of fabrication of the MOS capacitor-type optical modulator 100 shown in FIG. 2 is described below with reference to FIGS. 5a-5g.

Figure 5A:
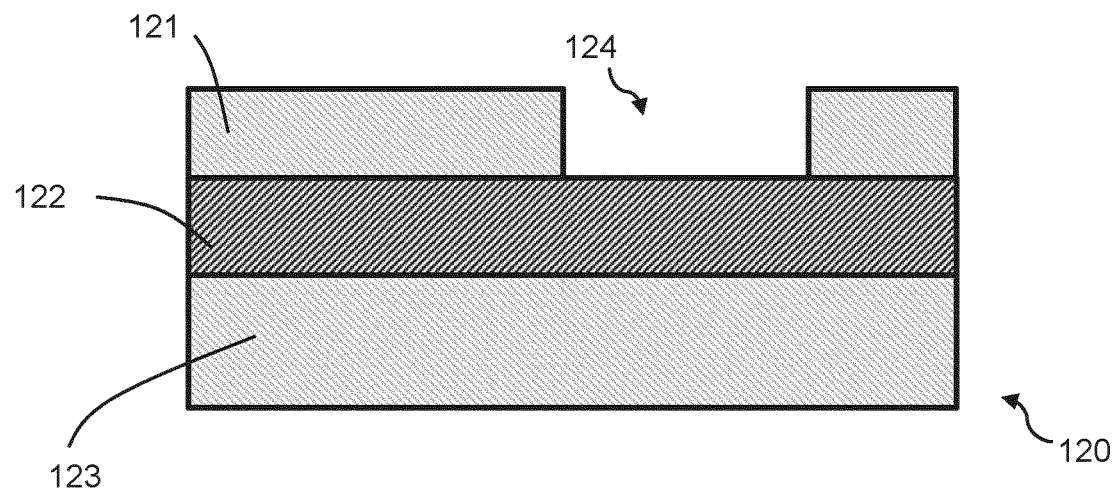
FIGS. 5a-5g depict steps of a variant method of fabricating the modulator of FIG. 2.

As shown in FIG. 5a, a silicon-on-insulator substrate 120 is initially provided comprising a silicon base layer 123, a buried silicon dioxide (BOX) layer 122 and a silicon device layer 121. The silicon device layer 121 has a Si(100) crystalline structure. A trench 124 is etched in the silicon device layer 121 to the BOX layer 122. The trench is etched using standard patterning and etching techniques. Although not illustrated in FIG. 5a, a first doped region is created within the silicon device layer 121 using standard implantation techniques.

Figure 5B:
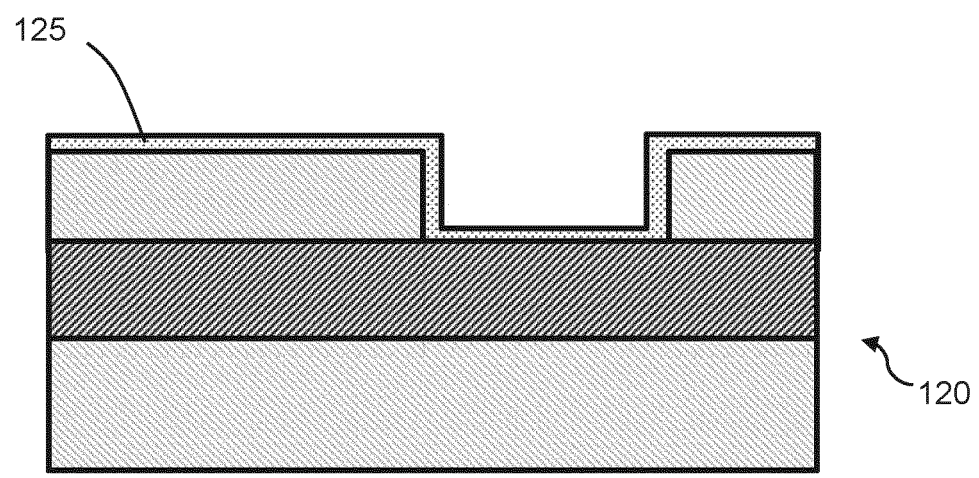
Figure 5C:
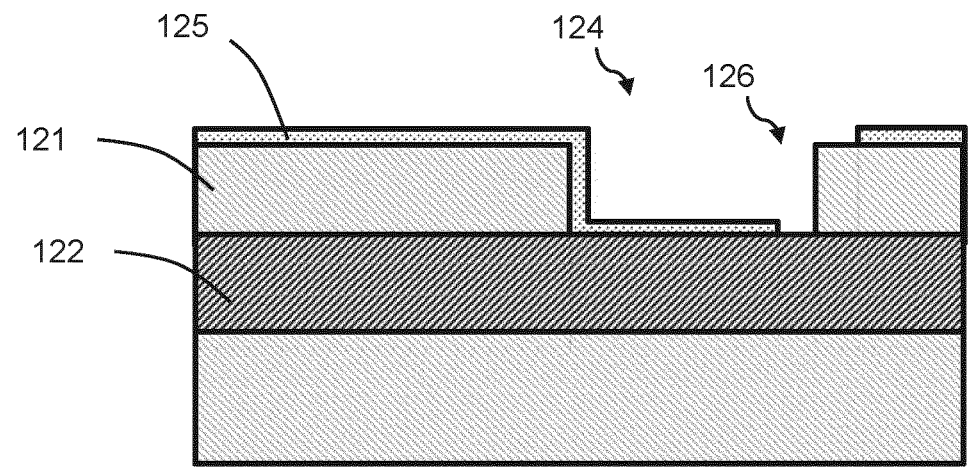

Next, as shown in FIG. 5b, a lower mask layer 125 comprising silicon nitride is deposited on top of the silicon device layer 121 and in the trench 124. The lower mask layer 125 will form the insulator layer 125 of the MOS capacitor-type optical modulator 100, shown in FIG. 2.

An opening 126 is then etched in the lower mask layer 125. Similarly to the step illustrated in FIG. 4c, the opening 126 in the lower mask layer 125 extends to the silicon device layer 121 and the BOX layer 122 in the trench 124. Again, opening 126 is etched using standard patterning and etching techniques. This opening 126 provides a point of exposed silicon from which a type III-V layer will subsequently be grown. The opening 126 is etched in the lower mask layer 125 in a region which will be laterally offset from a MOS capacitor region having a p-i-n junction of the modulator 100.

Figure 5D:
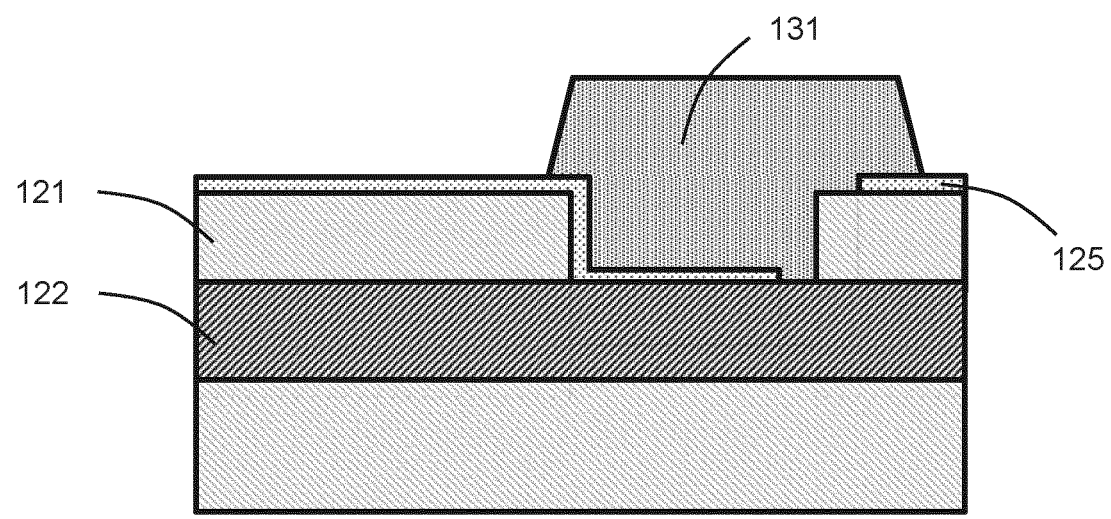

In contrast to the method step illustrated in FIG. 4d where a sacrificial layer is deposited, in FIG. 5d, a type III-V semiconductor region 131 is selectively and epitaxially grown from the exposed silicon device layer 121 in the opening 126. The type III-V semiconductor region 131 grows outwardly from the opening 126 to at least fill the trench 124.

Figure 5E:
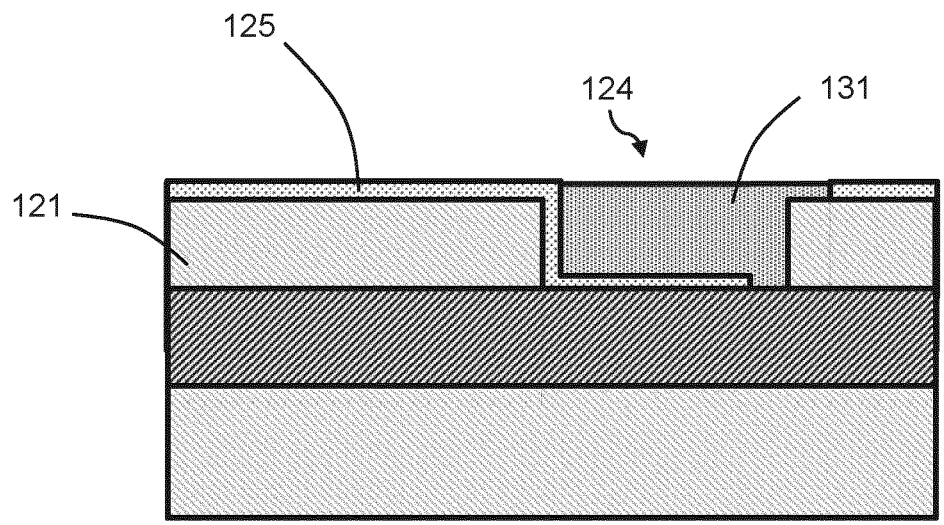

Then, the type III-V semiconductor region 131 is planarized by CMP so that the semiconductor region 131 is only present in the trench 124 (see e.g. FIG. 5e). In this way, the semiconductor region 131 in the trench 124 is levelled to the lower mask layer 125.

Figure 5F:
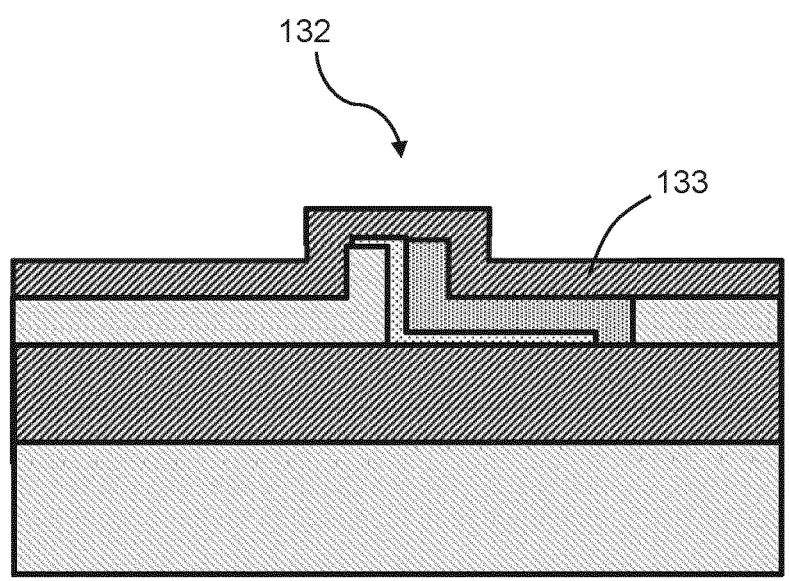

A waveguide structure 132 is formed by etching a portion of the unneeded type III-V semiconductor region 131, a portion of the lower mask layer 125 and a portion of the silicon device layer 121. An isolation layer 133 is deposited on top of the waveguide structure 132 (FIG. 5f).

Figure 5G:
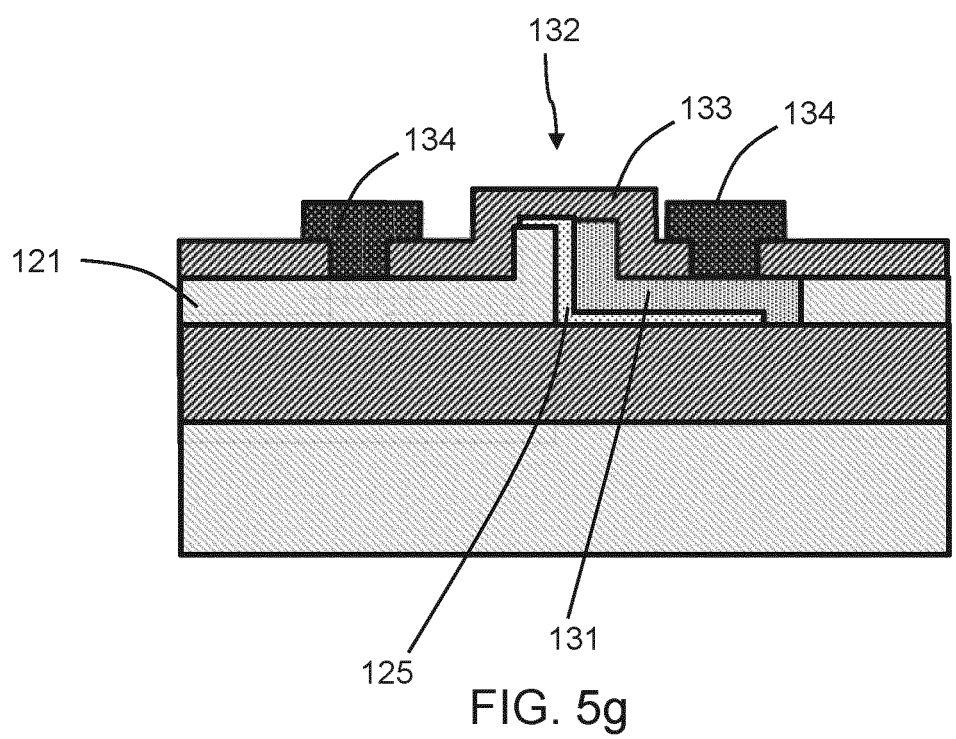

Finally, the isolation layer 133 is etched at two openings to the silicon device layer 121 and to the type III-V semiconductor region 131 respectively, and electrical contacts 134 are deposited through the isolation layer (FIG. 5g).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A MOS capacitor-type optical modulator comprising:
a silicon-on-insulator (SOI) substrate;
a first doped region in a silicon device layer of the SOI substrate; and
a second doped crystalline region laterally separated from the first doped region by a vertically extending insulator layer to form a lateral MOS capacitor region, wherein the first doped region, second doped crystalline region and insulator layer are formed from different materials,
wherein the insulator layer extends at an oblique angle relative to the substrate, so as to laterally separate the second doped crystalline region from the first doped region.

2. The MOS capacitor-type optical modulator of claim 1, wherein the second doped crystalline region is formed in a type III-V semiconductor region.

3. The MOS capacitor-type optical modulator of claim 1, wherein the insulator layer comprises silicon nitride.

4. The MOS capacitor-type optical modulator of claim 1, wherein the silicon device layer of the SOI substrate has a (100) crystalline orientation.

5. The MOS capacitor-type optical modulator of claim 1, wherein a first portion of the insulator layer extends horizontally on top of the first doped region, and a second portion of the insulator layer extends horizontally beneath the second doped crystalline region.

6. A method of fabricating the MOS capacitor-type optical modulator of claim 1, wherein the method comprises the steps of:
providing the first doped region in the silicon device layer; and
epitaxially growing a semiconductor region from the silicon device layer of the SOI substrate, wherein the semiconductor region comprises the second doped crystalline region, and the first doped region, second doped crystalline region and insulator layer are each formed from different materials.

7. The method according to claim 6, wherein the semiconductor region is epitaxially grown from a region of the silicon device layer laterally offset from the lateral MOS capacitor region.

8. The method according to claim 6, wherein the semiconductor region is a type III-V semiconductor region.

9. The method according to claim 6, wherein the silicon device layer of the SOI substrate has a (100) crystalline structure.

10. The method according to claim 6, wherein the method further comprises the step of:
   etching a portion of the semiconductor region to form a waveguide structure, the waveguide structure comprising the lateral MOS capacitor region.

11. The method according to claim 10, further comprising the steps of:
   depositing an isolation layer on the waveguide structure;
   applying a first electrical contact through the isolation layer to the first doped region; and
   applying a second electrical contact through the isolation layer to the second doped crystalline region.

12. The method according to claim 6, wherein the method further comprises the steps of:
   creating a cavity underneath an upper mask layer; and
   epitaxially growing the semiconductor region from the silicon device layer of the SOI substrate in the cavity.

13. The method according to claim 12, wherein the upper mask layer comprises silicon nitride.

14. The method according to claim 12, wherein the step of creating the cavity comprises:
   providing a sacrificial layer;
   depositing the upper mask layer on top of the sacrificial layer; and
   selectively etching the sacrificial layer to create the cavity.

15. The method according to claim 14, wherein the method further comprises the steps of:
   etching a trench in the silicon device layer of the SOI substrate;
   depositing a lower mask layer on top of the silicon device layer and in the trench;
   etching an opening in the lower mask layer to the silicon device layer at a region of the silicon device layer laterally offset from the lateral MOS capacitor region; and
   depositing the sacrificial layer on the lower mask layer and in the opening in the lower mask layer.

16. The method according to claim 15, further comprising the step of etching a portion of the sacrificial layer to the lower mask layer before depositing the upper mask layer.

17. The method according to claim 14, wherein the method further comprises the step of planarizing the sacrificial layer by Chemical Mechanical Planarization, CMP.

18. The method according to claim 14, wherein the sacrificial layer comprises aluminium oxide or amorphous silicon.

19. A method of fabricating the MOS capacitor-type optical modulator of claim 1, the method comprising the steps of:
   creating a cavity underneath an upper mask layer; and
   epitaxially growing a semiconductor region, comprising the second doped crystalline region, from the silicon device layer in the cavity.

* * * * *